United States Patent
Ghapgharan (10) Patent No.: US 11,772,774 B2
(45) Date of Patent: Oct. 3, 2023

(54) RIB MOUNTING FLANGES FOR AN UNMANNED AERIAL VEHICLE

(71) Applicant: AEROVIRONMENT, INC., Arlington, VA (US)

(72) Inventor: Emil Ghapgharan, Simi Valley, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 0 days.

(21) Appl. No.: 17/797,353

(22) PCT Filed: Feb. 3, 2021

(86) PCT No.: PCT/US2021/016350
§ 371 (c)(1),
(2) Date: Aug. 3, 2022

(87) PCT Pub. No.: WO2021/158618
PCT Pub. Date: Aug. 12, 2021

(65) Prior Publication Data
US 2023/0058877 A1 Feb. 23, 2023

Related U.S. Application Data

(60) Provisional application No. 62/970,139, filed on Feb. 4, 2020.

(51) Int. Cl.
*B64C 3/18* (2006.01)
*B64C 3/26* (2006.01)

(52) U.S. Cl.
CPC .............. *B64C 3/187* (2013.01); *B64C 3/185* (2013.01); *B64C 3/26* (2013.01)

(58) Field of Classification Search
CPC ............ B64C 3/187; B64C 3/185; B64C 3/26
See application file for complete search history.

(56) References Cited

U.S. PATENT DOCUMENTS

| | | | |
|---|---|---|---|
| 1,556,589 A * | 10/1925 | Clark | ................... B64C 3/185 52/696 |
| 2,362,301 A | 11/1944 | Pecker | |
| 2,988,152 A | 6/1961 | Katzenberger et al. | |
| 4,739,954 A | 4/1988 | Hamilton | |
| 6,386,481 B1 * | 5/2002 | Kallinen | ................... B64C 3/18 244/35 R |
| 2013/0240671 A1 * | 9/2013 | Kruse | ................... B64C 3/187 403/150 |
| 2018/0118327 A1 * | 5/2018 | Blevins | ................... B64C 3/52 |
| 2020/0148327 A1 * | 5/2020 | Elson | ................... B29C 53/382 |

FOREIGN PATENT DOCUMENTS

GB 808852 A 2/1959

OTHER PUBLICATIONS

International Search Report and Written Opinion for PCT/US2021/016350, dated Apr. 15, 2021.

* cited by examiner

*Primary Examiner* — Rodney A Bonnette
(74) *Attorney, Agent, or Firm* — Concept IP LLP; Pejman Yedidsion; Eric Aagaard (57) ABSTRACT

Systems, devices, and methods including one or more rib mounting flanges, where each rib mounting flange comprises: a spar opening configured to receive a main spar of a wing panel; one or more holes for receiving cross-bracing cables; and one or more holes for receiving cross-bracing cables; and one or more holes for connecting the rib mounting flange to an adjacent rib mounting flange.

13 Claims, 8 Drawing Sheets

RIB MOUNTING FLANGES FOR AN UNMANNED AERIAL VEHICLE

CROSS-REFERENCE TO RELATED APPLICATIONS

This application is a 35 U.S.C. § 371 National Stage Entry of International Application No. PCT/US21/16350, filed Feb. 3, 2021, which claims priority to and the benefit of U.S. Provisional Patent Application No. 62/970,139, filed Feb. 4, 2020, the contents of all of which are hereby incorporated by reference herein for all purposes.

TECHNICAL FIELD

Embodiments relate generally to rib flanges, and more particularly rib flanges for aerial vehicles.

BACKGROUND

An aerial vehicle may include one or more wings to sustain horizontal flight. These wings may sustain various loads during flight. If these loads are not properly dealt with, the wings may sustain damage and/or the lifespan of the aerial vehicle may be negatively impacted. Aerial vehicles may be manned or unmanned. A manned aerial vehicle may be controlled by a pilot. An unmanned aerial vehicle (UAV) may be remotely controlled by an operator and/or autonomously controlled by a processor.

SUMMARY

A system embodiment may include: one or more rib mounting flanges, where each rib mounting flange may include: a spar opening configured to receive a tubular main spar of a wing panel; one or more holes for fastening hardware associated with cross-bracing cables; and one or more holes for connecting the rib mounting flange to another rib mounting flange of an adjacent wing panel.

In additional system embodiments, each rib mounting flange may be configured to transfer a load from a rib member to the rib mounting flange and then to the main spar. Additional system embodiments may include: one or more rib members, where each rib member may be attached to each rib mounting flange. In additional system embodiments, each rib member may be attached to each rib mounting flange via an adhesive.

In additional system embodiments, each rib mounting flange comprises a plurality of pieces, for example, four pieces in certain instances, wherein the plurality of pieces adapt to a varying main spar profile. In additional system embodiments, each of the plurality of pieces may be attached around the main spar to connect the rib to the main spar. In additional system embodiments, an outside surface of the main spar may be irregular. In additional system embodiments, each rib mounting flange may be made of carbon fiber and epoxy. In additional system embodiments, an outside diameter of the main spar matches a diameter of the spar opening. Additional system embodiments may include: a mounting flange for a battery support rib, where the battery support rib may be attached to the plurality of pieces.

Another system embodiment may include: one or more wing panels comprising one or more spars; one or more rib mounting flanges, where each rib mounting flange comprises a spar opening configured to receive the one or more spars; and one or more rib members, where each rib member of the one or more rib members is attached to each rib mounting flange of the one or more rib mounting flanges.

In additional system embodiments, the one or more spars comprise a main spar, and each of the one or more rib mounting flanges is configured to transfer a load from the one or more rib members to the rib mounting flange and then to the main spar. In additional system embodiments, each rib mounting flange comprises a plurality of pieces. In additional system embodiments, each of the plurality of pieces is attached around the one or more spars to connect the rib mounting flange to the one or more spars, wherein the plurality of pieces adapt to a varying main profile of the one or more spars. In additional system embodiments, an outside surface of a main spar (110) of the one or more spars is irregular.

Additional system embodiments may further comprising one or more cross-bracing cables. In additional system embodiments, the one or more rib mounting flanges comprise an inboard end rib flange, where the one or more rib members comprise an inboard end rib member, where the inboard end rib flange connects the inboard end rib member to the one or more spars, and where the inboard end rib flange is located proximate a connection between two adjacent wing panels of the one or more wing panels. In additional system embodiments, the one or more rib mounting flanges further comprise an outboard end rib flange, where the one or more rib members comprise an outboard end rib member, where the outboard end rib flange connects the outboard end rib member to the one or more spars, and where the outboard end rib flange is located proximate an end of the one or more wing panels.

In additional system embodiments, the one or more rib mounting flanges further comprise a center compression rib flange, wherein the one or more rib members comprise a center compression rib member, where the center compression rib flange connects the center compression rib member to the one or more spars, where the center compression rib flange is located proximate a center of the one or more wing panels, where the one or more cross-bracing cables are connected between the inboard end rib flange, the center compression rib flange, and the outboard rib flange, and where the outboard end rib member, center compression rib member, and center compression rib member absorb cross-bracing loads and transfer the loads to the one or more spars. In additional system embodiments, the one or more rib mounting flanges further comprise two or more light weight rib flanges, where the two or more light weight rib flanges connect the one or more rib members to the one or more spars, and where the two or more light weight rib flanges are located between the inboard end rib member and the center compression rib member and the center compression rib member and the outboard end rib member.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
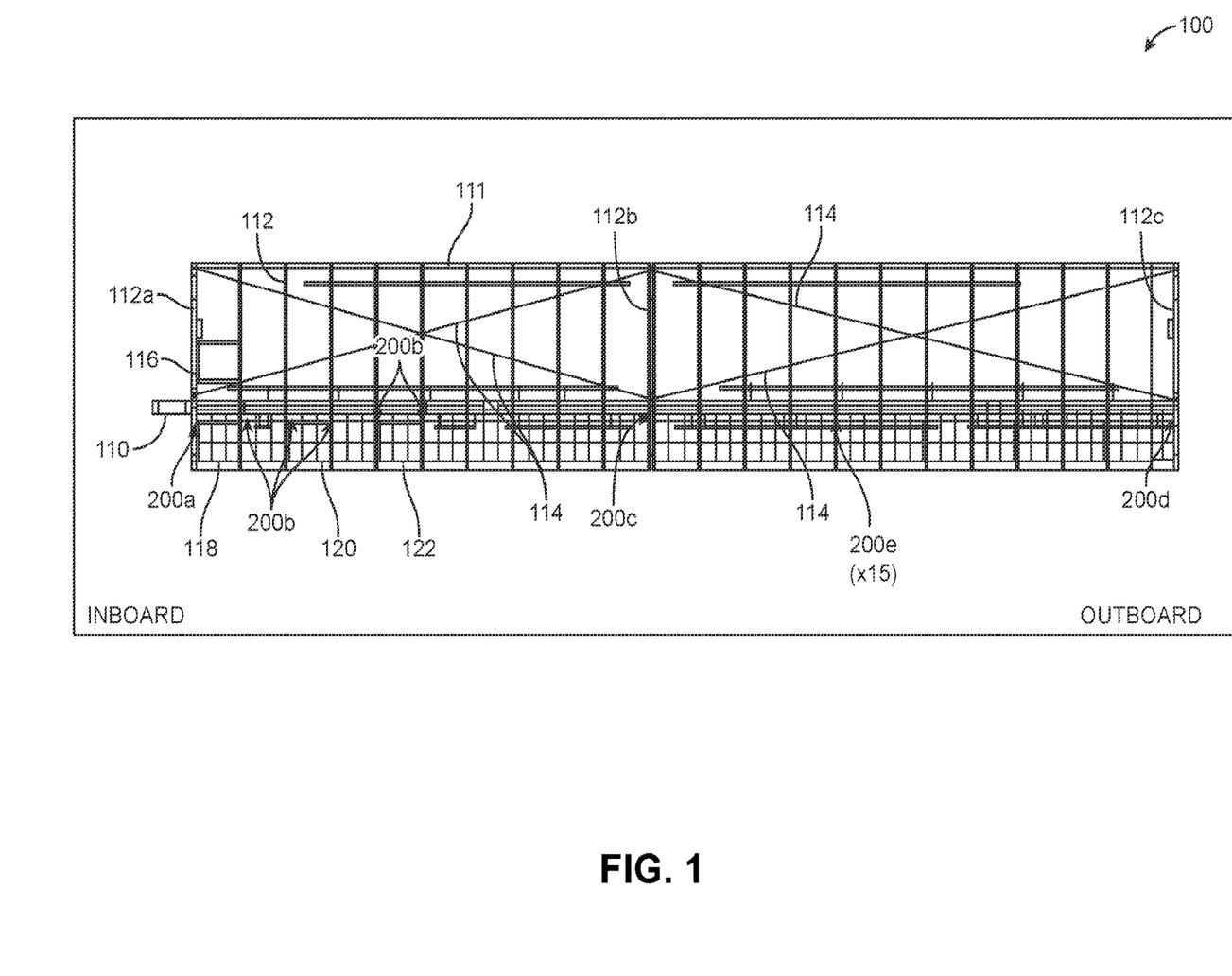
FIG. 1 depicts a plan view of a wing panel of an unmanned aerial vehicle.

With respect to FIG. 1, a wing panel 100 of an unmanned aerial vehicle (UAV) is depicted. The wing panel 100 may have a main spar 110, an aft spar 111, and a plurality of rib members 112. In one embodiment, the wing panel may have twenty-four rib members 112, including an inboard rib 112a, a center compression rib 112b, and an outboard rib 112c. The outboard rib 112c may act the same as the inboard rib 112a in some embodiments. In some embodiments another wing panel or a wing tip panel may connect to the wing panel and mate with the outboard rib 112c. In some embodiments, the inboard rib 112a may mate with a fuselage of the UAV. Other numbers of rib members 112 are possible and contemplated. In one embodiment, the rib members 112 may have the airfoil shape of the wing panel 100. The wing panel 100 may also include lightweight cross-bracing cables 114. In one embodiment, the lightweight cross-bracing cables 114 carry the in-plane shear of the UAV.

The wing panel 100 may include one or more battery mounting locations 116, 118, 120, 122. The battery mounting locations 116, 118, 120, 122 may be located proximate the inboard rib 112a so as to increase mass proximate the inboard rib 112a and/or fuselage of the UAV and to provide a lower moment on the wing panel 100 proximate the outboard rib 112c and/or a wing tip. Additional battery mounting locations may be added to a front of the wing panel 100 proximate the main spar 110.

UAVs are aircraft with no onboard pilot and may fly autonomously or remotely. In one embodiment, the UAV is a high altitude long endurance aircraft. In one embodiment, the UAV may have one or more motors, for example, between one and forty (40) motors, and a wingspan between one hundred (100) feet and four hundred (400) feet. In one embodiment, the UAV has a wingspan of approximately two hundred sixty (260) feet and is propelled by a plurality of propellers coupled to a plurality of motors, for example, ten (10) electric motors, powered by a solar array covering the surface of the wing, resulting in zero emissions. Flying at an altitude of approximately sixty five thousand (65,000) feet above sea level and above the clouds, the UAV is designed for continuous, extended missions of up to months without landing.

The UAV functions optimally at high altitude and is capable of considerable periods of sustained flight without recourse to land. In one embodiment, the UAV may weigh approximately three thousand (3,000) lbs.

Figure 2:
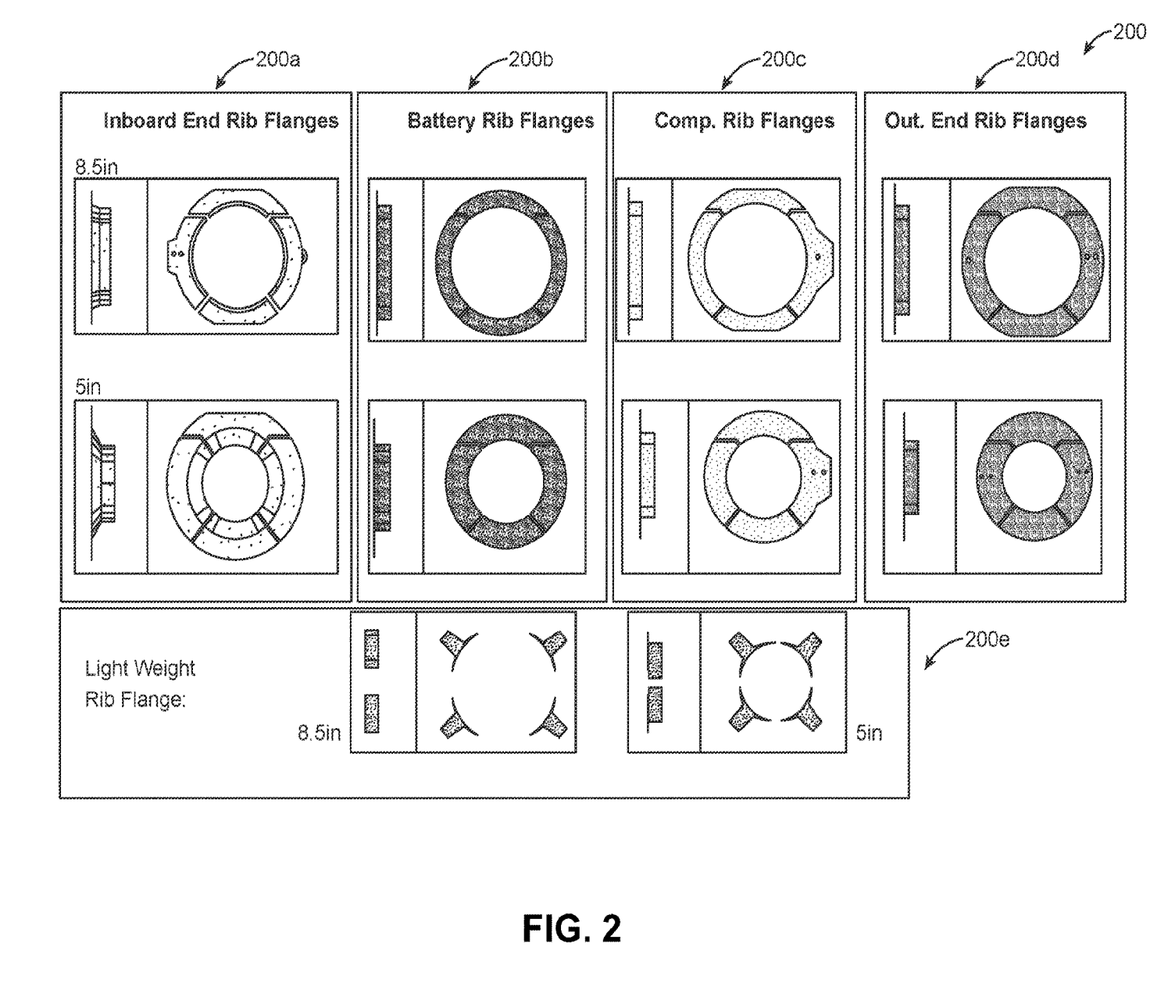
FIG. 2 depicts side elevation and plan views of examples of rib mounting flanges associated with the wing panel of FIG. 1.

With respect to FIG. 2, a variety of rib mounting flanges 200 (200a, 200b, 200c, 200d, 200e) for connection of the plurality of rib members 112 to the main spar 110 are illustrated. The rib mounting flanges 200 may serve as load transfer mechanisms. More specifically, each rib flange 200 may transfer a load from the rib members (112, FIG. 1) to the rib mounting flanges 200 and then to the main spar (110, FIG. 1). Generally speaking, the end rib members (112a, 112c, FIG. 1) and center compression rib member (112b, FIG. 1) absorb cross-bracing loads and transfer the loads to the main spar (110, FIG. 1) and the aft spar (111, FIG. 1). Therefore, the end rib mounting flanges 200a, 200d and center compression rib mounting flange 200c must be strong enough to carry those loads. Also, aerodynamics may cause a pitching moment on the wing panel (100, FIG. 1). The rib members (112, FIG. 1) may absorb pressure loads exerted on the wing panel 100, and transfer said loads/forces to the main spar (110, FIG. 1). In additional system embodiments, the rib mounting flanges may be segmented to allow for adjusting of the size of the spar opening to match the varying profile of the main spar. In one embodiment, the rib mounting flange is segmented by partially slicing the rib mounting flange radially to conform to the shape of the main spar.

In one embodiment, the rib mounting flanges 200 may be glued to the rib members (112, FIG. 1), such as by an adhesive, and each rib mounting flange 200 may have a spar opening to accommodate the main spar (110, FIG. 1). In other embodiments, the rib mounting flanges 200 may be attached to the rib members via adhesive, friction fit, magnets, threaded connectors, and/or the like. In one embodiment, magnets may be used to secure the rib mounting flanges 200 in a correct or desired position and/or orientation. In one embodiment, a UAV may have seven wing panels. In one embodiment, each wing panel has two end ribs, one center compression rib, five to eight battery mount ribs, and the remaining ribs may be light weight ribs. In one embodiment, each wing panel may have each of the different rib mounting flanges 200a, 200b, 200c, 200d, 200e. Each rib mounting flange 200a, 200b, 200c, 200d, 200e absorbs a given load, with the loads varying from wing panel to wing panel. Additionally, the main spar may have a varying diameter from wing panel to wing panel. Therefore, the rib mounting flanges 200a, 200b, 200c, 200d, 200e have varying main spar openings. Each rib mounting flange 200a, 200b, 200c, 200d, 200e is designed to carry different amounts of load through them. The light weight rib mounting flanges 200e are designed to carry the least load. The other rib mounting flanges 200a, 200b, 200c, 200d are designed to carry higher loads.

Figure 3:
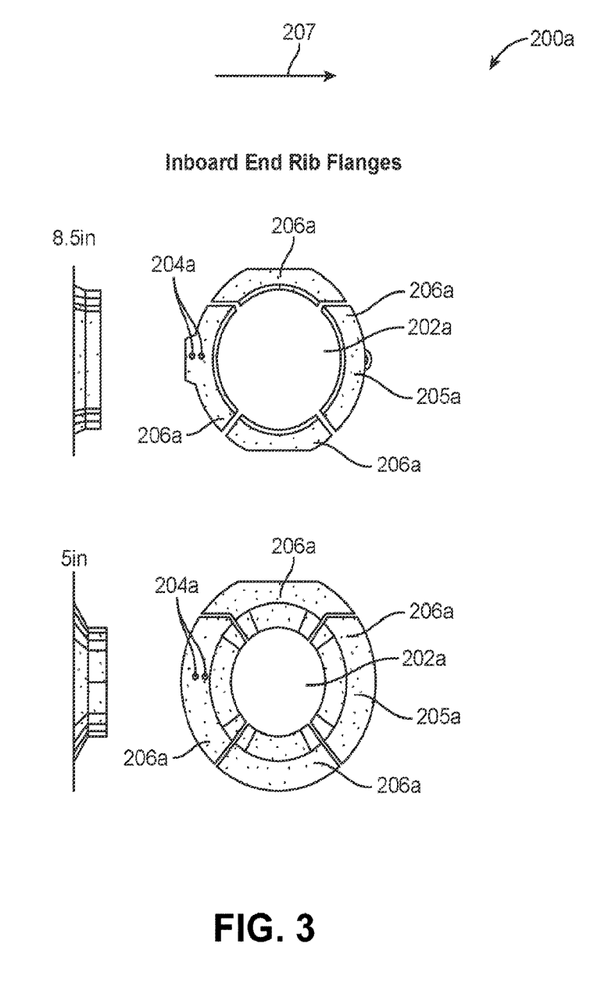
FIG. 3 depicts side elevation and plan views of two examples of inboard end rib mounting flanges of FIG. 2

For example, and with respect to FIG. 3, rib flanges 200a are shown in further detail, where the top panel shows the inboard end rib flange 200a with an 8.5 inch diameter spar opening 202a to accommodate the main spar (110, FIG. 1) of an outboard mid wing panel, and the bottom panel shows the rib flange 200a with a 5 inch diameter spar opening 202a to accommodate the main spar (110, FIG. 1) of a tip wing panel. Each spar opening 202a diameter may match the outside diameter of an associated main spar to accommodate that main spar. In one embodiment, the rib flanges 200a are inboard end rib flanges. In one embodiment, the rib flanges 200a have one or more holes, e.g., apertures, 204a for accommodating hardware associated with the cross-bracing cables (114, FIG. 1). In one embodiment, the rib flanges 200a may have a pair of holes or apertures 204a for receiving two cross-bracing cables (114, FIG. 1). In one embodiment, the rib mounting flanges 200a have one or more holes or apertures 205a for connection of adjacent wing panels. In one embodiment, the rib flanges 200a have a plurality of pieces 206a. In one embodiment, the rib flanges 200a may have four pieces 206a that when sandwiched around the main spar 110, form an annular ring contoured around the spar. Each piece 206a of the rib mounting flange 200a may be separated from each other piece by a gap so as to allow the rib mounting flange 200*a* to attach about the main spar (110, FIG. 1). Each piece 206*a* of the rib mounting flange 200*a* may be secured to the main spar (110, FIG. 1) by a fastener while the adhesive dries. In some embodiments, each piece 206*a* of the rib mounting flange 200*a* may be secured via a fastener such as a clamp, zip ties, worm drive type clamp, worm gear hose clamp, and/or the like. This fastener may be removed once the adhesive has dried and the rib mounting flange 200*a* is securely attached to the main spar (110, FIG. 1). Similar fasteners and attachments may be used for all of the rib mounting flanges as shown in FIGS. 3-7.

Segmenting the rib mounting flange 200*a* into the four pieces 206*a* makes it easier to install the rib mounting flange 200*a* around a main spar that may have a somewhat irregular outside surface or varying profile. The inboard end rib flanges 200*a* may absorb the load from the cross-bracing cables (114, FIG. 1). In one embodiment, the inboard end rib flanges 200*a* are made of carbon fiber and epoxy. The inboard end rib flanges 200*a* are associated with the inboard end rib members (112*a*, FIG. 1) where there are connections between adjacent wing panels; therefore, the inboard end rib mounting flanges 200*a* and outboard end rib mounting flanges 200*d* sustain large loads and are thus larger and studier than other rib flanges (e.g., rib flanges 200*b*, 200*c*, 200*e*, FIG. 2). The inboard end rib mounting flanges 200*a* and outboard end rib mounting flanges 200*d* have a larger contact surface with the main spar in order to carry higher loads as compared to the other rib mounting flanges described herein. An arrow 207 shows the forward-facing direction of the UAV.

Figure 4:
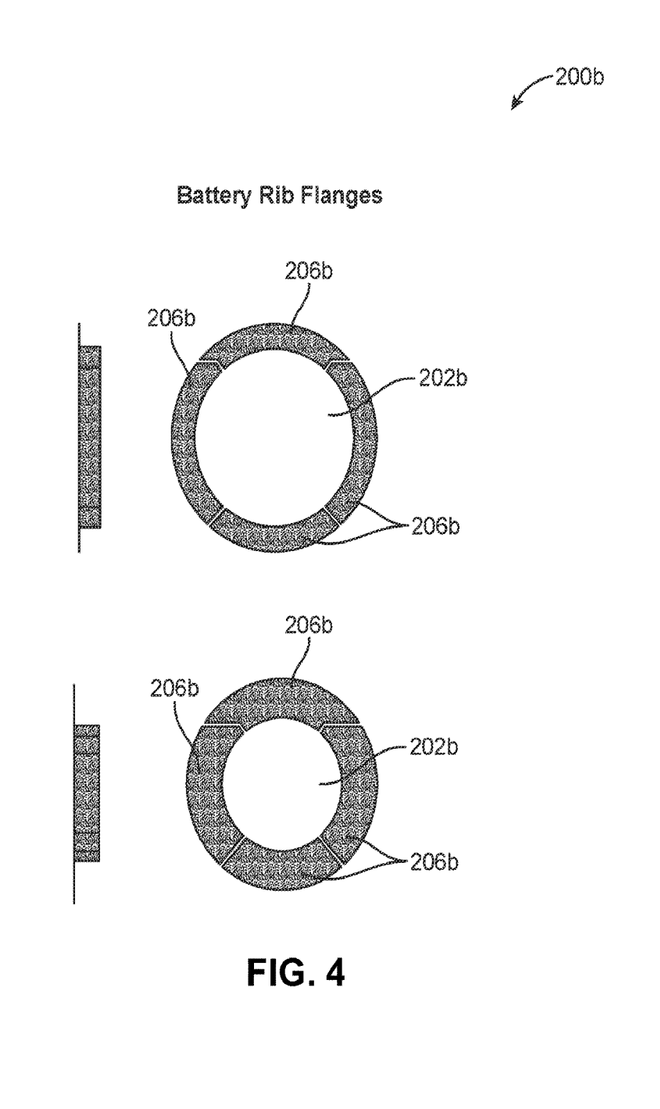
FIG. 4 depicts side elevation and plan views of two examples of battery rib mounting flanges of FIG. 2.

With respect to FIG. 4, battery rib mounting flanges 200*b* are shown in further detail. The top panel shows the rib mounting flange 200*b* with a ten-inch diameter spar opening 202*b* to accommodate the main spar (110, FIG. 1) of the inboard mid wing panel, and the bottom panel shows the rib mounting flange 200*b* with a five-inch diameter spar opening 202*b* to accommodate the main spar (110, FIG. 1) of the tip wing panel. Each spar opening 202*b* diameter may match the outside diameter of an associated main spar to accommodate the spar. In one embodiment, the rib flanges 200*b* have a plurality of pieces 206*b*. In one embodiment, the rib flanges 200*a* may have four pieces 206*b* that when sandwiched around a spar, form an annular ring contoured around the spar. In one embodiment, the rib mounting flanges 200*b* are battery rib flanges for supporting a battery of a UAV. In one embodiment, the battery rib mounting flanges 202*b* are made of carbon fiber. In one embodiment, the wing panel may have at least five battery rib mounting flanges 200*b*. In one embodiment, the battery rib mounting flanges 200*b* include a top marking index point and are attached, such as by adhesive, to a smooth tool side of the battery rib.

Figure 5:
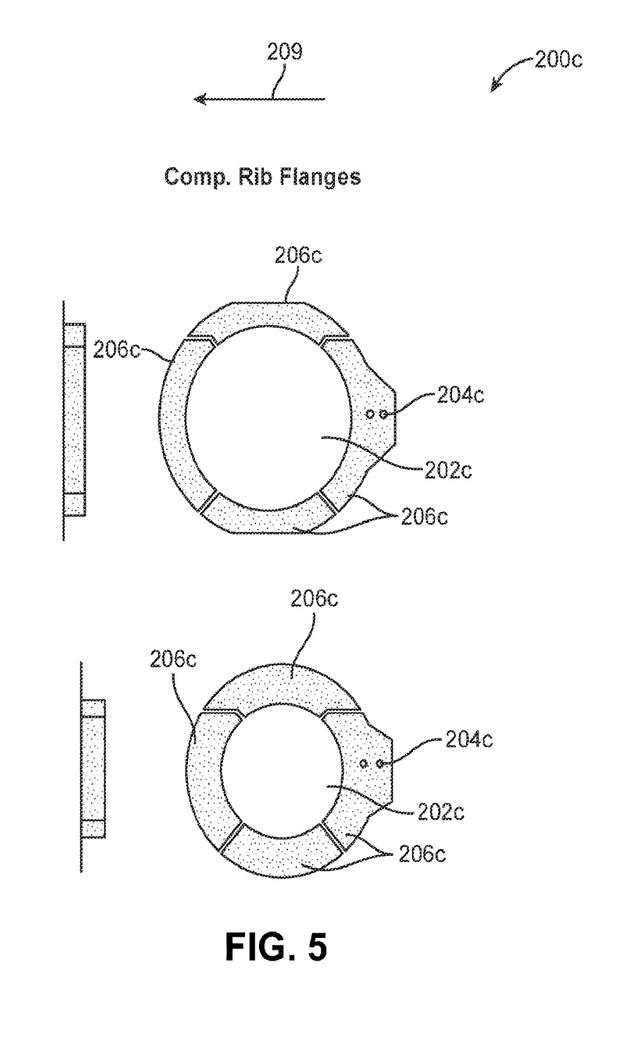
FIG. 5 depicts side elevation and plan views of two examples of center compression rib mounting flanges of FIG. 2.

With respect to FIG. 5, rib mounting flanges 200*c* are shown in further detail. The top panel shows the rib flange 200*c* with a 10 inch diameter spar opening 202*c* to accommodate the main spar 110 of an inboard mid wing panel, and the bottom panel shows the rib mounting flange 200*c* with a 5 inch diameter spar opening 202*c* to accommodate the main spar 110 of a tip wing panel. Each spar opening 202*c* diameter may match the outside diameter of an associated main spar to accommodate the spar. In one embodiment, the rib mounting flanges 200*c* have a pair of holes 204*a* for accommodating hardware associated with the cross-bracing cables 114. In one embodiment, the rib mounting flanges 200*c* have a plurality of pieces 206*c*. In one embodiment, the rib flanges 200*c* may have four pieces 206*a* that when sandwiched around a spar, form an annular ring contoured around the spar. In one embodiment, the rib mounting flanges 200*c* are center compression rib mounting flanges. In one embodiment, the center compression rib flanges 202*c* are made of carbon fiber. An arrow 209 shows the forward-facing direction of the UAV.

Figure 6:
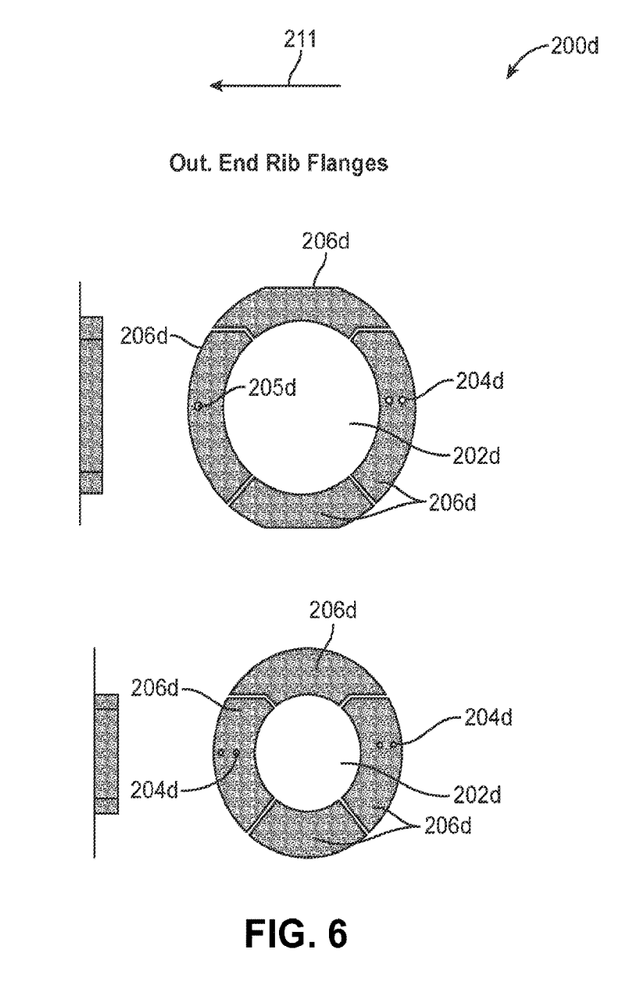
FIG. 6 depicts side elevation and plan views of two examples of outboard end rib mounting flanges of FIG. 2.

With respect to FIG. 6, rib mounting flanges 200*d* are shown in further detail. The top panel shows the rib flange 200*d* with an 8.5-inch diameter spar opening 202*d* to accommodate the main spar (110, FIG. 1) of an outboard mid wing panel, and the bottom panel shows the rib mounting flange 200*d* with a five-inch diameter spar opening 202*d* to accommodate the main spar (110, FIG. 1) of a tip wing panel. Each spar opening 202*d* diameter may match the outside diameter of an associated main spar to accommodate the spar. In one embodiment, the rib mounting flange 200*d* of the lower panel has two or more of holes 204*a* for accommodating hardware associated with the cross-bracing cables (114, FIG. 1). In one embodiment, the rib mounting flange 200*d* may have a pair of holes or apertures 204*a* for accommodating the cross-bracing cables (114, FIG. 1). In one embodiment, at least one of the holes 204*a* is drilled during initial assembly of the UAV. In one embodiment, the thickness of the rib mounting flange 200*d* allows for drilling of the holes 204*d* while still retaining a desired strength. In one embodiment, the rib mounting flanges 200*d* associated with outboard ribs (112*c*, FIG. 1, except outboard ribs 112*c* associated with the wing tip panels) have one or more holes 205*d* for connection of adjacent wing panels. In one embodiment, the mounting rib flanges 200*d* are outboard end rib flanges. In one embodiment, the rib flanges 200*d* have a plurality of pieces 206*d*. In one embodiment, the rib flanges 200*a* may have four pieces 206*d* that when sandwiched around a spar, form an annular ring contoured around the spar. The outboard end rib flanges 202*d* may absorb the load from the cross-bracing cables (114, FIG. 1). In one embodiment, the outboard end rib flanges 202*d* are made of carbon fiber and epoxy. The outboard end rib flanges 202*a* are associated with the inboard rib members (112*a*, FIG. 1) where there are connections between adjacent wing panels. Therefore, the outboard end rib flanges 202*a* sustain large loads and are thus larger and studier than other rib flanges (e.g., rib flanges 202*b*, 202*c*, 202*e*, FIG. 2). An arrow 211 shows the forward-facing direction of the UAV.

Figure 7:
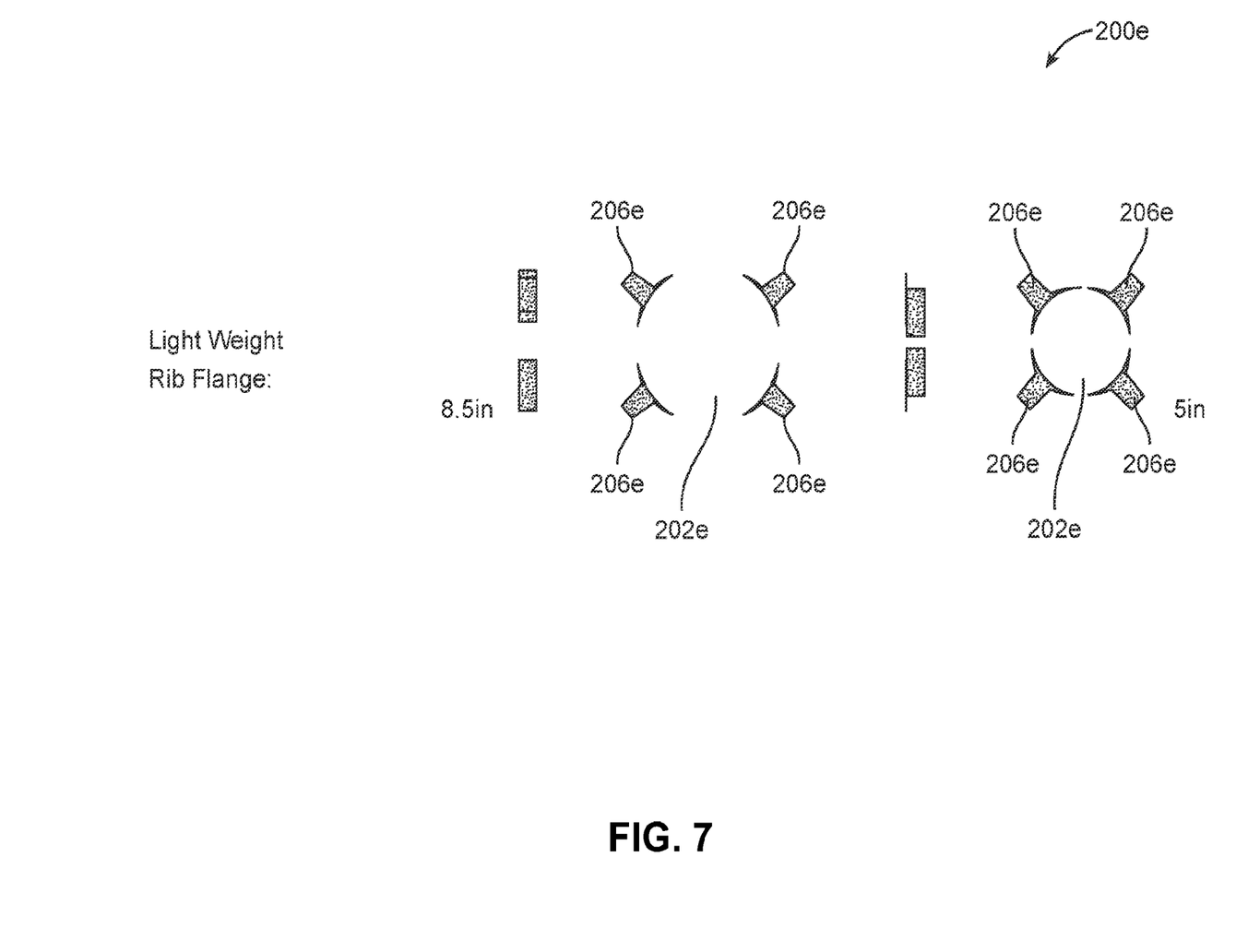
FIG. 7 depicts side elevation and plan views of two examples of light weight rib mounting flanges of FIG. 2.

With respect to FIG. 7, rib mounting flanges 200*e* are shown in further detail. The left panel shows the rib mounting flange 200*e* with an 8.5-inch diameter spar opening 202*e*, and the right panel shows the rib mounting flange 200*e* with a five-inch diameter spar opening 202*e*. Each spar opening 202*e* diameter may be slightly larger than the diameter of an associated main spar. In one embodiment, the rib mounting flanges 200*e* are light weight rib mounting flanges and used in all of the panels of the UAV where there are not end ribs, center compression ribs, or battery mount ribs. The rib mounting flanges 200*e* are lighter by weight and carry lower loads relative to the other rib mounting flanges disclosed herein. The rib mounting flanges 200*e* include individual independent flanges 206*e* split into a plurality of pieces to fit the contour of an associated main spar 110. In one embodiment, the flanges 206*e* are split into four pieces. The rib mounting flanges 200*e* may be glued to the rib members, thus securing the rib members to the main spar. In one embodiment, the wing panel (100, FIG. 1) may have at least fifteen rib mounting flanges 200*e*.

Figure 8:
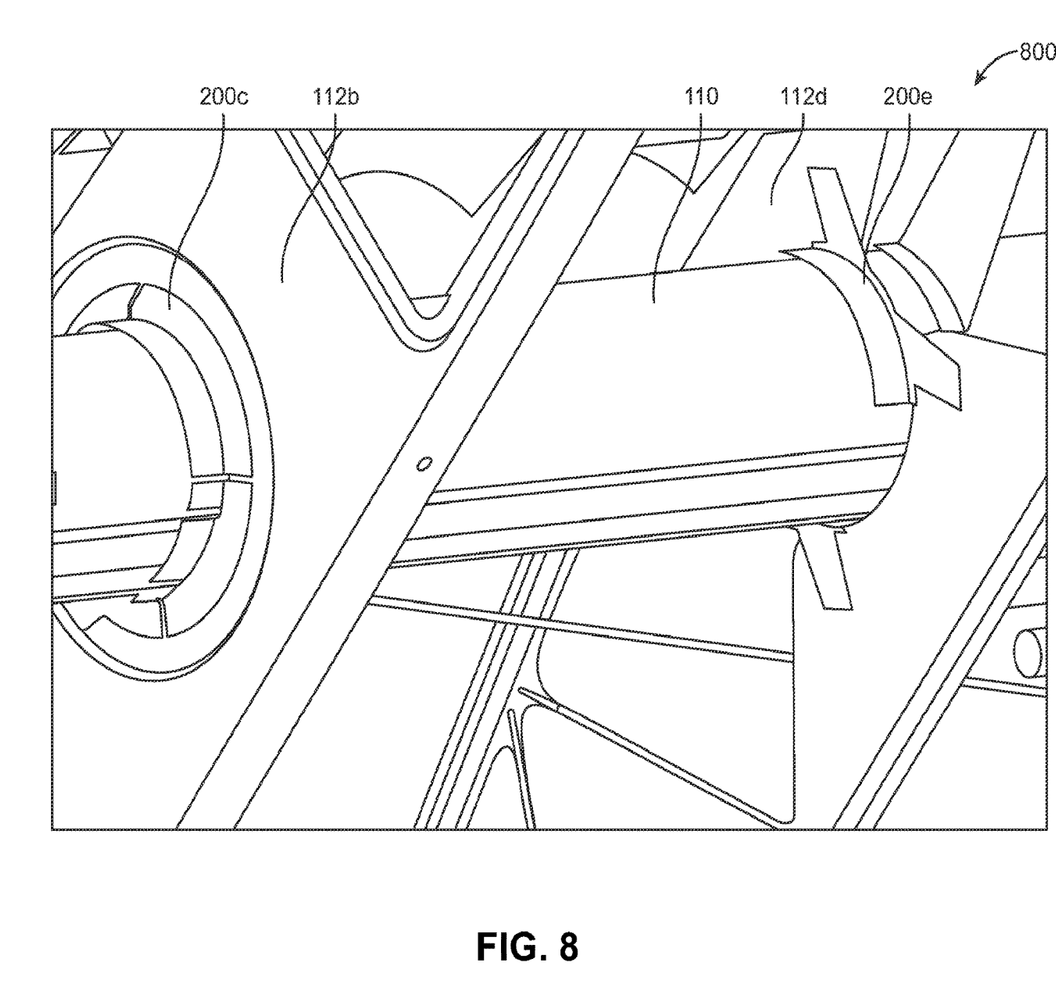
FIG. 8 depicts a perspective view of a center compression rib mounting flange and a light weight rib mounting flange.

FIG. 8 depicts a perspective view of a center compression rib mounting flange 200*c* and a light weight rib mounting flange 200*e* in a portion 800 of a wing panel. The center compression rib mounting flange 200c is secured about the main spar 110 of the wing panel, such as by an adhesive. The center compression rib mounting flange 200c secures the center compression rib member 112b to the main spar 110. The center compression rib member 112b may absorb pressure loads exerted on the wing panel, and transfer said loads/forces to the main spar 110 via the center compression rib mounting flange 200c.

The light weight rib mounting flange 200e is secured about the main spar 110 of the wing panel, such as by an adhesive. The light weight rib mounting flange 200e secures the light weight rib member 112d to the main spar 110. The light weight rib member 112d may absorb pressure loads exerted on the wing panel, and transfer said loads/forces to the main spar 110 via the light weight rib mounting flange 200e. The light weight rib mounting flange 200e transfers lower loads/forces to the main spar 110 as compared to the center compression rib mounting flange 200c.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
   one or more rib mounting flanges, wherein each rib mounting flange comprises:
      a spar opening configured to receive a main spar of a wing panel;
      one or more holes for receiving cross-bracing cables;
      one or more holes for connecting the rib mounting flange to an adjacent rib mounting flange;
      a plurality of pieces; and
      a battery, wherein the battery is attached to the plurality of pieces.

2. The system of claim 1, wherein each rib mounting flange is configured to transfer a load from a rib member to the rib mounting flange and then to the main spar.

3. The system of claim 1, further comprising:
   one or more rib members, wherein each rib member is attached to each rib mounting flange.

4. The system of claim 3, wherein each rib member is attached to each rib mounting flange via an adhesive.

5. The system of claim 1, wherein each of the plurality of pieces is attached around the main spar to connect the rib mounting flange to the main spar, wherein the plurality of pieces adapt to a varying main spar profile.

6. The system of claim 5, wherein an outside surface of the main spar is irregular.

7. The system of claim 1, wherein each rib mounting flange is made of carbon fiber and epoxy.

8. The system of claim 1, wherein an outside diameter of the main spar matches a diameter of the spar opening.

9. A system comprising:
   one or more wing panels comprising one or more spars;
   one or more rib mounting flanges, wherein each rib mounting flange comprises a spar opening configured to receive the one or more spars, and wherein each rib mounting flange comprises a plurality of pieces;
   one or more rib members, wherein each rib member of the one or more rib members is attached to each rib mounting flange of the one or more rib mounting flanges;
   one or more cross-bracing cables;
   wherein the one or more rib mounting flanges comprise an inboard end rib flange;
   wherein the one or more rib members comprise an inboard end rib member;
   wherein the inboard end rib flange connects the inboard end rib member to the one or more spars;
   wherein the inboard end rib flange is located proximate a connection between two adjacent wing panels of the one or more wing panels;
   wherein the one or more rib mounting flanges further comprise an outboard end rib flange;
   wherein the one or more rib members comprise an outboard end rib member;
   wherein the outboard end rib flange connects the outboard end rib member to the one or more spars;
   wherein the outboard end rib flange is located proximate an end of the one or more wing panels;
   wherein the one or more rib mounting flanges further comprise a center compression rib flange;
   wherein the one or more rib members comprise a center compression rib member;
   wherein the center compression rib flange connects the center compression rib member to the one or more spars;
   wherein the center compression rib flange is located proximate a center of the one or more wing panels;
   wherein the one or more cross-bracing cables are connected between the inboard end rib flange, the center compression rib flange, and the outboard rib flange; and
   wherein the outboard end rib member, center compression rib member, and inboard end rib member absorb cross-bracing loads and transfer the loads to the one or more spars.

10. The system of claim 9, wherein the one or more spars comprise a main spar, and wherein each of the one or more rib mounting flanges is configured to transfer a load from the one or more rib members to the rib mounting flange and then to the main spar.

11. The system of claim 9, wherein each of the plurality of pieces is attached around the one or more spars to connect the rib mounting flange to the one or more spars, wherein the plurality of pieces adapt to a varying main profile of the one or more spars.

12. The system of claim 11, wherein an outside surface of a main spar of the one or more spars is irregular.

13. The system of claim 9, wherein the one or more rib mounting flanges further comprise two or more light weight rib flanges, wherein the two or more light weight rib flanges connect the one or more rib members to the one or more spars, and wherein the two or more light weight rib flanges are located between the inboard end rib member and the center compression rib member and the center compression rib member and the outboard end rib member.

* * * * *